US006941132B2

(12) United States Patent
Van Lieshout et al.

(10) Patent No.: US 6,941,132 B2
(45) Date of Patent: Sep. 6, 2005

(54) TRANSPORT OF RADIO NETWORK-ORIGINATED CONTROL INFORMATION

(75) Inventors: Gert-Jan Van Lieshout, Apeldoorn (NL); Göran Rune, Linköping (SE); Per Willars, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 589 days.

(21) Appl. No.: 09/801,869

(22) Filed: Mar. 9, 2001

(65) Prior Publication Data

US 2001/0036823 A1 Nov. 1, 2001

Related U.S. Application Data

(60) Provisional application No. 60/191,499, filed on Mar. 23, 2000, and provisional application No. 60/190,097, filed on Mar. 20, 2000.

(51) Int. Cl.[7] .................................................. H04M 3/00

(52) U.S. Cl. ....................... 455/418; 455/419; 455/509; 455/517; 370/529; 370/341; 375/142

(58) Field of Search ................................ 455/418, 436, 455/419, 438, 442, 509, 517; 370/329, 337, 341, 347, 431, 442, 436, 331, 348; 375/142, 146, 149

(56) References Cited

U.S. PATENT DOCUMENTS 6,002,919 A 12/1999 Posti
6,122,310 A * 9/2000 Ziemer et al. .............. 375/142

(Continued)

FOREIGN PATENT DOCUMENTS

DE 19931131 A1 1/2001
EP 0660546 A1 6/1995
WO 99/53704 A1 10/1999

OTHER PUBLICATIONS

3GPP TS 25.302 V3.7.0 (2000–12), Technical Specification, 3rd Generation Partnership Project; Technical Specification Group Radio Access Network; Services provided by the physical layer (Release 1999).

*Primary Examiner*—Rafael Perez-Gutierrez
*Assistant Examiner*—Khawar Iqbal
(74) *Attorney, Agent, or Firm*—Nixon & Vanderhye P.C.

(57) ABSTRACT

In a radio access network (RAN) where information may be sent to a mobile radio unit using a shared radio channel shared by other mobile radio units, a first transport bearer is established between a first RAN node, e.g., a drift RNC, and a second RAN node, e.g., a base station, to transport data to be transmitted on the shared radio channel. A second transport bearer is established between the first and second RAN nodes to transport control information originated in the first RAN node that relates to the first transport bearer data. The first RAN node then transmits the control information over the second transport bearer to the second RAN node. The control information might include, for example, scheduling information known to the first RAN node because the first RAN node supervises scheduling of data to be transmitted on the shared radio channel. The control information may provide to the mobile radio unit information needed to decode the data transmitted on the shared radio channel. Such needed information might include, for example, a frame identifier, a specific radio resource like a spreading code, and/or an indication of how different radio resources associated with different connections are multiplexed on the shared radio channel. In one example, non-limiting embodiment, the control information includes transport format indication information such as transmit format combination indicator (TFCI) information employed in third generation Universal Mobile Telephone Systems (UMTS) in accordance with the 3GPP specification.

36 Claims, 6 Drawing Sheets

U.S. PATENT DOCUMENTS 6,363,252 B1 * 3/2002 Hamalainen et al. ....... 455/436
6,374,112 B1 * 4/2002 Widegren et al. ........ 455/452.2
6,449,290 B1 * 9/2002 Willars et al. .............. 370/507
6,456,826 B1 * 9/2002 Toskala et al. ............ 455/63.1
6,466,556 B1 * 10/2002 Boudreaux .................. 370/331
6,480,476 B1 * 11/2002 Willars ....................... 370/311
6,507,567 B1 * 1/2003 Willars ....................... 370/321
6,515,972 B1 * 2/2003 Gage et al. ................. 370/328
6,574,473 B2 * 6/2003 Rinne et al. ................ 455/436
6,600,917 B1 * 7/2003 Maupin ................... 455/414.1
6,628,942 B1 * 9/2003 Beming et al. ............. 455/458
6,631,125 B1 * 10/2003 Longoni et al. ............ 370/341
6,683,860 B1 * 1/2004 Forssell et al. ............. 370/329
6,687,249 B1 * 2/2004 Noguera-Rodriguez et al. .......................... 370/331
6,721,566 B2 * 4/2004 Longoni et al. ............ 455/436
6,724,813 B1 * 4/2004 Jamal et al. ................ 375/219
2001/0043576 A1 * 11/2001 Terry .......................... 370/328

* cited by examiner

| |
|---|
| Connection Frame Number (CFN) |
| TFI or TFCI |
| Spare |
| Spare Extension |

TRANSPORT OF RADIO NETWORK-ORIGINATED CONTROL INFORMATION

RELATED APPLICATIONS

This application claims priority from commonly-assigned U.S. Provisional Patent Application Ser. Nos. 60/190,097 and 60/191,499, filed Mar. 20, 2000 and Mar. 23, 2000, respectively, the entire contents of which are incorporated herein by reference.

FIELD OF THE INVENTION

The present invention relates to radio access, more specifically, to how certain control information communicated to a mobile radio terminal can be efficiently transported in a Radio Access Network (RAN).

SUMMARY OF THE INVENTION

In a radio access network (RAN) where information may be sent to a mobile radio unit using a radio channel shared by other mobile radio units, a first transport bearer is established between a first RAN node and a second RAN node to transport data ultimately to be transmitted on the shared radio channel. A second transport bearer is established between the first and second RAN nodes to transport control information originated in the first RAN node that relates to the first transport bearer data. The first RAN node then transmits the control information over the second transport bearer to the second RAN node.

The control information might include, for example, information known to the first RAN node because the first RAN node supervises scheduling of data to be transmitted on the shared radio channel. The control information may provide the mobile radio unit with information needed to decode the data transmitted on the shared radio channel. Such needed information might include a frame identifier, a specific radio resource like a spreading code in a CDMA type of communication system, and/or an indication of how different radio resources are multiplexed on the shared radio channel. In one example, non-limiting embodiment, the control information includes transport format indication information such as transmit format indicator (TFI) and/or transmit format combination indicator (TFCI) information employed in third generation (3G) Universal Mobile Telephone Systems (UMTS) systems in accordance with the 3GPP specification.

In a preferred, example embodiment, the first RAN node is a drift radio network controller (DRNC), and the second RAN node is a base station (BS). A third transport bearer may be established to transport dedicated radio channel data and dedicated radio channel control information through the RAN for transmission to a mobile radio unit on a dedicated radio channel. This third transport bearer may be established by a serving radio network controller (SRNC) working in conjunction with the DRNC to support the connection with the mobile radio unit.

In one example implementation of the present invention, a computer-generated data signal, (e.g., generated in a computer in the DRNC), is transported on a separate transport bearer between the DRNC and the base station having a particular format. A frame number field includes a specific frame number identifying a frame on the shared radio channel. A transport format indicator field includes information relating to a particular radio channel resource in the corresponding frame. In one example implementation, the transport format indicator field includes an index to a transport format table previously stored in the mobile radio unit. In other words, the index addresses particular entries in the look-up table so the mobile can retrieve certain information that will allow it to receive and decode information intended for that mobile radio unit on the shared radio channel. For example, since the DRNC is in charge of scheduling how data is multiplexed in a frame on the shared radio channel and allocating particular radio resources, such as channelization codes and associated spreading factors, the DRNC can convey to the mobile radio, using the transport format indicator, these types of specific details to allow the mobile radio unit to decode information sent over the shared radio channel.

BRIEF DESCRIPTION OF THE DRAWINGS

The objects, features, and advantages of the invention will be apparent from the following description of the preferred but non-limiting example embodiment described in conjunction with the following drawings. The drawings are not necessarily to scale or comprehensive, emphasis instead being placed upon illustrating the principles of the invention.

DESCRIPTION OF THE FIGURES

In the following description, for purposes of explanation and not limitation, details are set forth pertaining to a specific RAN architecture, having certain interfaces, signaling, and messages, in order to provide an understanding of the present invention. However, it will be apparent to one skilled in the art that the present invention may be practiced in other implementations, embodiments, and contexts that depart from these specific details.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figures 1, 2:
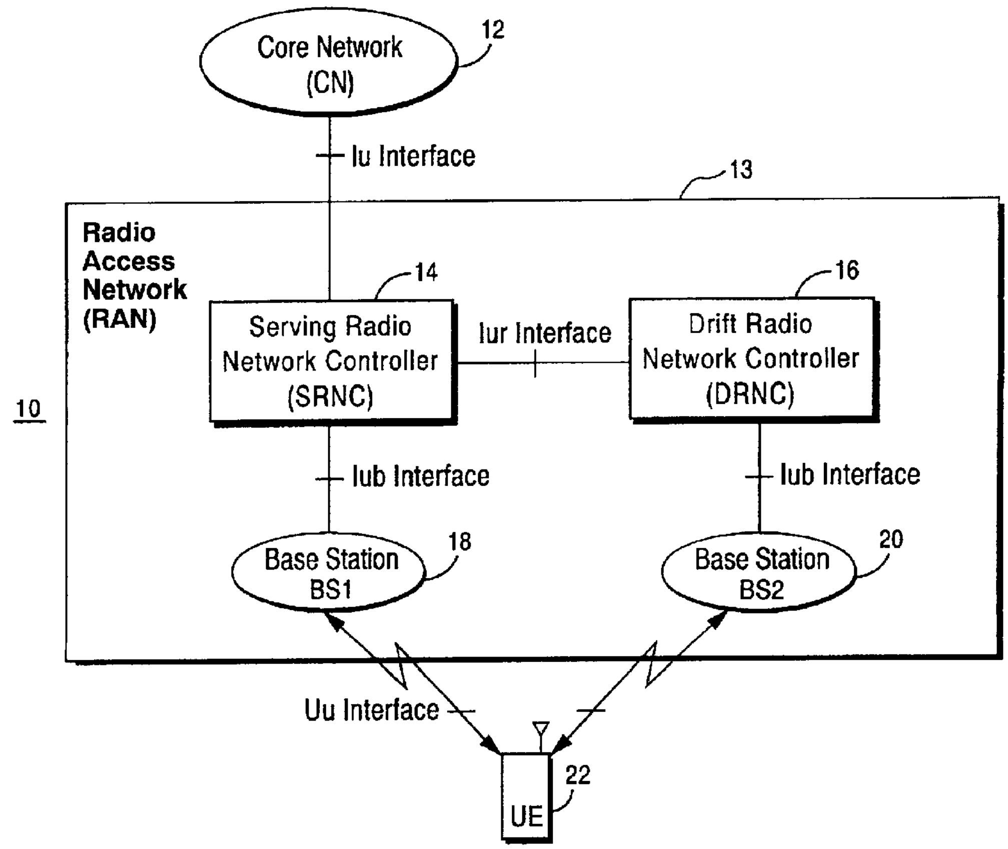
FIG. 1 is a function block diagram of a radio communications system in which the present invention may be employed.
FIG. 2 is an example transport format indicator (TFI) signaling message.

The architecture of an example Radio Access Network (RAN) 13, the interfaces between nodes in the RAN 13, and the physical channels on the radio interface are now described with reference to the radio communications system 10 shown in FIG. 1. User Equipment (UE) 22, such as a mobile or fixed radio terminal, is used by a subscriber to access services offered by one or more core networks (CN) 12 (only one is shown). Examples of core networks include the PSTN, the ISDN, the Internet, other mobile networks, etc. Core networks may be coupled to the radio access network 13 through circuit-switched and/or packet-switched core network service nodes like Mobile Switching Center (MSC) (not shown) or a Serving GPRS Support Node (SGSN) (not shown). The radio access network 13 typically includes plural Radio Network Controllers (RNCs) 14, 16. Each RNC controls radio connectivity with mobile terminals within a geographical area, e.g., one or more cells, by way of one or more base stations (BS) 18, 20.

For each connection between a UE mobile terminal 30 and a core network node 12, an RNC may perform one of two roles. As a Serving RNC (SRNC) 18, the RNC controls the connection with the mobile terminal within the RAN. Sometimes, while a connection is active, the mobile terminal moves to a geographical area controlled by another RNC. This other RNC via which the connection is routed to the mobile terminal is called a Drift RNC (DRNC) 16. In the DRNC role, the RNC supports the SRNC by supplying radio resources controlled by the DRNC that are needed to support the connection with the mobile terminal. The DRNC is connected to the SRNC through a logical interface labeled Iur. Although there is only one SRNC, there may be more than one DRNC involved in a mobile terminal-CN connection, depending on any movement of the mobile terminal and radio environment conditions.

A Base Station (BS) node (18, 20), (sometimes called a "Node B"), provides UE radio connectivity in one or more cells. Each cell covers a limited geographical area. A base station is coupled to and controlled by a Controlling RNC (CRNC). A CRNC can be an SRNC or a DRNC. The CRNC performs admission control for all the resources of the base stations it is controlling. In addition, the CRNC performs the scheduling of common and shared physical channels (as described below) on the radio interface for these BSs. In FIG. 1, the RNC 14 labeled "SRNC" is the CRNC for base station (BS1) 18. The RNC 16 labeled "DRNC" is the CRNC for base station (BS2) 20. A base station is connected to its CRNC through a logical Iub interface.

User data is transported on logical "transport bearers" over the Iub/Iur interfaces between the different nodes in the RAN. A transport bearer typically transports one transport channel including user data information (an information stream), and possibly also control information like cyclic redundancy check (CRC), bit error rate (BER), transport format indicators like TFIs and/or TFCIs (described below), etc. Depending on the transport network used, these logical transport bearers may, for example, be mapped to actual ATM Adaptation Layer 2 (AAL2) transport connections (in the case of an ATM-based transport network) or User Data Protocol (UDP) transport connections (in the case of an IP-based transport network).

The radio interface may include two groups of physical radio channels:

(1) dedicated physical channels (referred to as DCH in the 3GPP specification) and (2) shared physical channels (referred to as DSCH in the 3GPP specification). Dedicated physical channels may be used for transporting information between a single UE terminal and a core network and are not shared or used by other mobile terminals. A shared physical channel may be used by multiple UE terminals, e.g., using a multiplexing scheme such as code or time division multiplexing. One or more transport bearers are mapped to a physical radio channel.

When a DRNC provides resources for a mobile terminal-core network (CN) connection, there are different DRNC control functions for dedicated types of physical channels and for shared types of physical channels. For dedicated physical channels, the DRNC is involved in admission control because it must commit DRNC resources, (e.g., radio resources like spreading codes in a CDMA type system), to support the UE terminal-CN connection. Once the DRNC commits some of the resources it controls to support the UE terminal-CN connection, the DRNC is not responsible for scheduling or other supervising of the physical channel resources for that UE terminal-CN connection. Instead, this responsibility is handled by the SRNC. However, the DRNC may inform the SRNC of local conditions, like a congestion situation in a cell, and may request the SRNC to change the information rate on the dedicated physical channel.

For shared physical channels, the DRNC is again involved in admission control when the mobile UE terminal-core network (CN) connection is established, to the extent its DRNC resources are needed to support that connection. After the DRNC commits its resources to support the UE terminal-CN connection, however, the DRNC must perform one or more additional control or supervisory functions. Because a shared physical channel is used by multiple UE terminals, the DRNC—not the SRNC—performs the final scheduling of the resources on the shared physical channel.

In the downlink (DL) direction from RAN to the UE terminal, due to the last moment resource scheduling in the DRNC, the UE terminal typically does not know which shared physical channel resources, will be used by the RAN for its UE terminal-CN connection at each moment in time, e.g., spreading codes, frame multiplex times, etc. In order to overcome this uncertainty, (1) the UE terminal may monitor continuously all shared physical channel resources to detect which resources are used for its connection, or (2) the RAN can inform the UE terminal about the common/shared resources it is using to support that UE terminal connection at each point in time. For the second approach (2), the RAN must continuously inform the UE terminal about the shared physical channel resources used at each moment in time. To accomplish this, the RAN must send to the UE resource identification/allocation messages on a parallel-established, dedicated radio channel before the UE is to receive the information on the shared radio channel.

Radio channel information streams are transported in the RAN between the SRNC and the involved BS on transport bearers over the Iub and Iur interfaces. A transport bearer transports information related to either a dedicated physical radio channel or a shared physical radio channel. The information carried on a transport bearer used for transporting information related to a dedicated physical channel passes essentially transparently through the DRNC. However, in diversity handover connections, the DRNC may perform a combining (uplink from each BS)/splitting (downlink to each BS) functions for this information because multiple base stations coupled to the DRNC are supporting the UE terminal-CN connection. If the DRNC does not need to perform such combining/splitting, e.g., the two BSs are under the same DRNC, the DRNC need not manipulate the transported information in neither the uplink nor downlink direction. In this case, the DRNC functions like a conduit or relay node.

For information carried on a transport bearer relating to shared physical channels, the DRNC must schedule the physical radio channel-related information received for different mobile terminals from one (or possibly more) SRNCs, i.e., multiplex different information streams onto the shared radio channel at different times using different radio resources. The goal is to optimize use of the shared physical channel resources on the radio interface. In addition, the DRNC may perform a rate control function with the SRNC, i.e., the DRNC requests the SRNC to slow down its data transmission in order to avoid congestion on the shared physical channel.

The issue is how to get this and other kinds of control information originating at the DRNC to the mobile radio so it knows when and how to decode the information sent to it on the shared radio channel. Indeed, the timing of the physical channel information transport in the RAN is important for successful communication over the shared channel. For scheduling control, the information transported in the downlink is labeled with a timestamp indicating when the information needs to be sent over the radio interface. The base stations may use a receive "window" when receiving data from an SRNC or a DRNC. If data is received within the window, that data can be processed and transmitted on the radio interface. If the information is received too early, the base station may not have enough buffer capacity to temporarily store the received information. If the information is received too late, the base station may not have enough time to process the received information and send it out on the radio interface at the correct moment in time. The signaling on the Iub/Iur interfaces can support procedures, (e.g., a timing adjustment request message), by which the base station can request its CRNC (for shared physical channels) or an SRNC (for dedicated physical channels) to adjust the time at which information is sent to the base station.

One way in which the identity of particular physical channel resources to be used, (e.g., radio resources like spreading codes), and how these resources are to be used, (e.g., type of channel coding and coding rate), may be communicated by the RAN to the mobile terminal is through the use of Transport Format Indication (TFI) and/or Transport Format Combination Indication (TFCI) control messages employed in the 3GPP specification. The invention is not limited any specific type of transport control message format or information. The TFI and TFCI are simply examples.

A TFI or TFCI message may be used to describe these kinds of characteristics of a dedicated physical channel (hereafter "TFI1" or "TFCI1") as well as of a shared physical channel (hereafter "TFI2" or "TFCI2"). Again, a TFI or a TFCI is just an example of a control message, and other control messages as well as other types of control information may be used. Using a TFI example for purposes of illustration only, an SRNC determines a TFI1 for each dedicated transport channel, and a DRNC determines the TFI2 for each shared transport channel. The base station maps the TFI1 information for all dedicated transport channels (if any) to a TFCI1. Similarly, the base station maps the TFI2 information for other shared transport channels (if any) to a TFCI2. If there is only one dedicated transport channel and one shared transport channel, the TFCI1 corresponds to one TFI1 value, and the TFCI2 corresponds to one TFI2 value. Both the TFCI1 and the TFCI2 are provided to the UE terminal by the BS on a dedicated physical radio channel.

After receiving the TFCI1 control information over the dedicated physical control channel, the UE terminal knows how the different transport channels are multiplexed onto the dedicated physical radio channel. The UE is also aware of the downlink physical channel resources, (e.g., spreading factor, channelization code, etc.), that are allocated when the radio link is first set up. With this information, the UE terminal can receive and demodulate information transmitted over the dedicated radio channel.

On the other hand, a shared radio channel may use one of several radio resources, (e.g., one of several radio channel WCDMA spreading codes), based on the current radio resource scheduling by the CRNC. Because it is impractical for the UE terminal to know and check for information regarding all the radio resource(s) currently selected for use by the CRNC, the UE terminal is informed of the currently used radio resources for the shared physical channels, in this example, using the TFCI2 control message. The TFCI2 may identify for the UE terminal the particular radio resources, (e.g., spreading codes), to be used by the common/shared physical radio channel at a certain future moment in time. The TFCI2 may also indicate the time or multiplexing position within the identified frame that corresponds to the information directed to the mobile unit which should be decoded.

Typically, the TFCI 1 and TFCI 2 information is an index to a look-up table provided to and stored in the mobile radio unit during the time that a connection is established between a core network and the mobile unit. Information in the look-up table includes individually addressable entries of radio resource identification, e.g., a channelization code and corresponding spreading factor, as well as multiplexing or timing information that identify which portions of a particular frame on the shared radio channel contain information for the particular mobile radio unit. The TFCI index is used to address that look-up table and retrieve the corresponding information used by the mobile radio to then receive and properly decode information intended for it from the shared radio channel.

A description of TFIs and TFCIs may be found in the 3GPP RAN2 specification entitled "Service Provided by the Physical Layer," 25.302, revision v.3.3.0, incorporated herein by reference. FIG. 2 shows an example TFI message format in a signaling control frame. An eight bit field indicates a connection frame number (CFN) followed by a TFI or TFCI indicator. The TFI and/or TFCI may be used to address control information previously stored in a look-up table in the mobile radio as described above. This reduces the amount of data to be transmit over the radio interface. Of course, control information could be communicated directly rather than indirectly. Optional Spare and Spare Extension bit fields are also shown.

Figure 3:
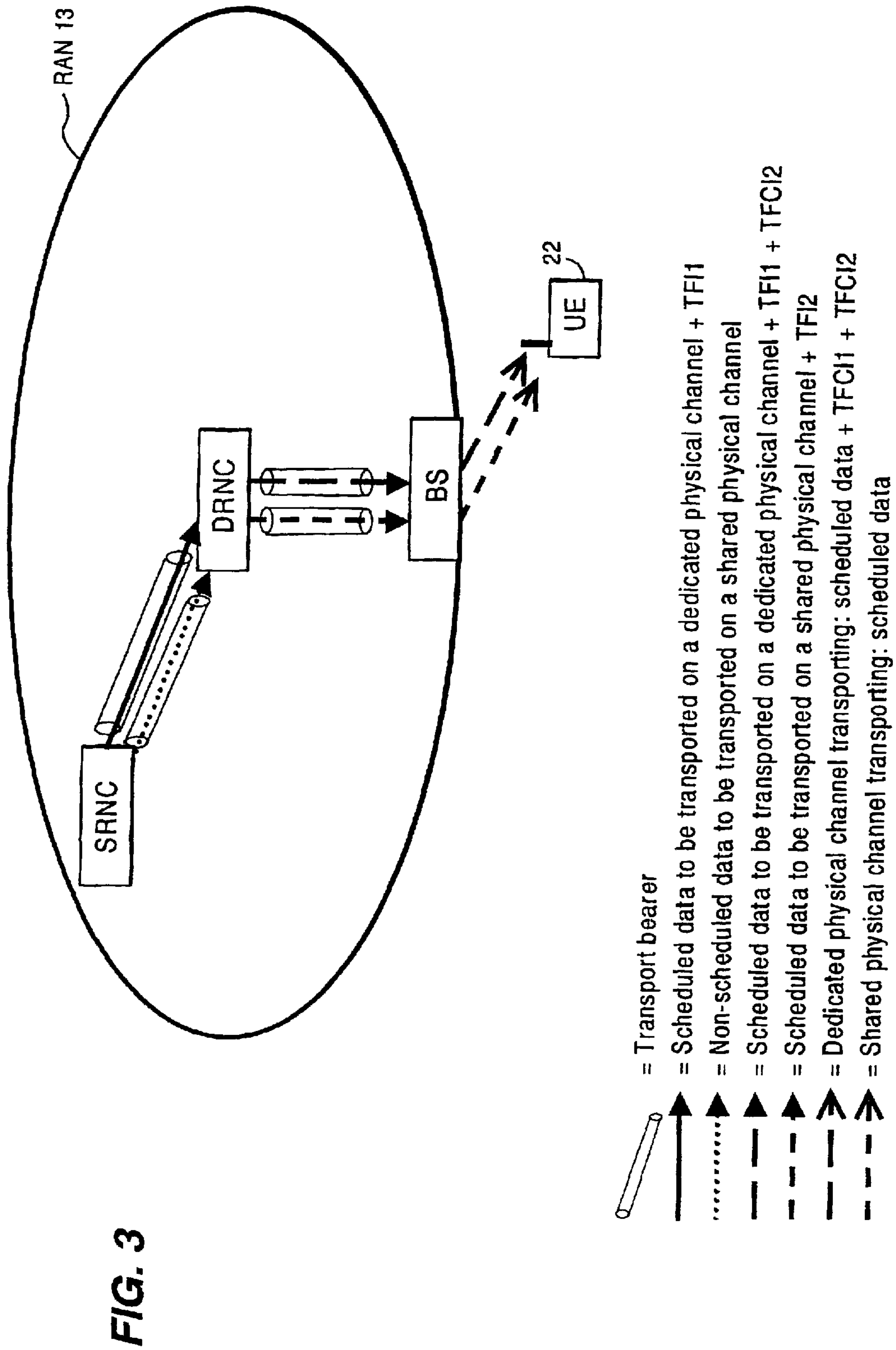
FIG. 3 is an example radio access network architecture in which certain control information (Like TFI and/or TFCI messages) to be communicated to a mobile radio terminal is transported in the radio access network architecture.

One approach for communicating TFCI2 information is for the DRNC to insert the TFCI2 into the information stream to be transmitted on the dedicated physical radio channel. The BS then transmits both the TFCI1 and TFCI2 on the dedicated radio physical channel over the radio interface. FIG. 3 illustrates this approach. The scheduled data and the TFI1 control information to be transported on a dedicated physical traffic radio channel are received at the DRNC on a corresponding transport bearer. See the solid line in the transport bearer (shown as a tube) between the SRNC 14 and DRNC16. The DRNC inserts the TFCI2 into that information stream before it is forwarded to the BS via the same transport bearer (shown as a dashed line in a tube) between DRNC 16 and BS2 20. This approach for conveying the TFCI2 data, however, has some drawbacks.

First, insertion of the TFCI2 by the DRNC is inconsistent with a RAN architecture in which control and traffic information related to a dedicated physical channel are transported between SRNC and BS by "transparently" passing through the DRNC. If the DRNC must insert the TFCI2, it is no longer transparent. Instead, the DRNC must be knowledgeable of the data content it receives and forwards, which increases the complexity of and the delay caused by the DRNC.

Second, if the TFCI2 information arrives too late at the BS, the BS will send a timing adjustment request in the uplink direction to the RNC. All uplink information from the BS related to dedicated physical channels is supposed to be passed transparently to the SRNC. Accordingly, the timing adjustment request is transparently passed from the BS by the DRNC to the SRNC. However, it is the DRNC—not the SRNC—that should perform the timing adjustment function. The DRNC adds the TFCI2 to the downlink information stream to be transported over the dedicated physical radio channel.

Third, insertion of the TFCI2 by the DRNC handicaps potential changes to the RAN configuration. One such change envisioned by the inventors of the present invention is described further below in conjunction with FIG. 7. That change includes establishing a direct transport bearer between the SRNC and a BS for transporting information related to a dedicated physical channel. Although such a direct transport bearer may have some disadvantages, (e.g., combining/splitting are not possible in the DRNC if needed), the benefits of such a solution may outweigh the drawbacks. Example benefits might include a decreased load on the DRNC and a decreased transport delay on the dedicated physical channel in the RAN, i.e., no DRNC processing and buffering delay. In any event, this approach eliminates the need to include the DRNC in the transport bearer route for data to be transported on a dedicated physical radio channel.

Figure 4:
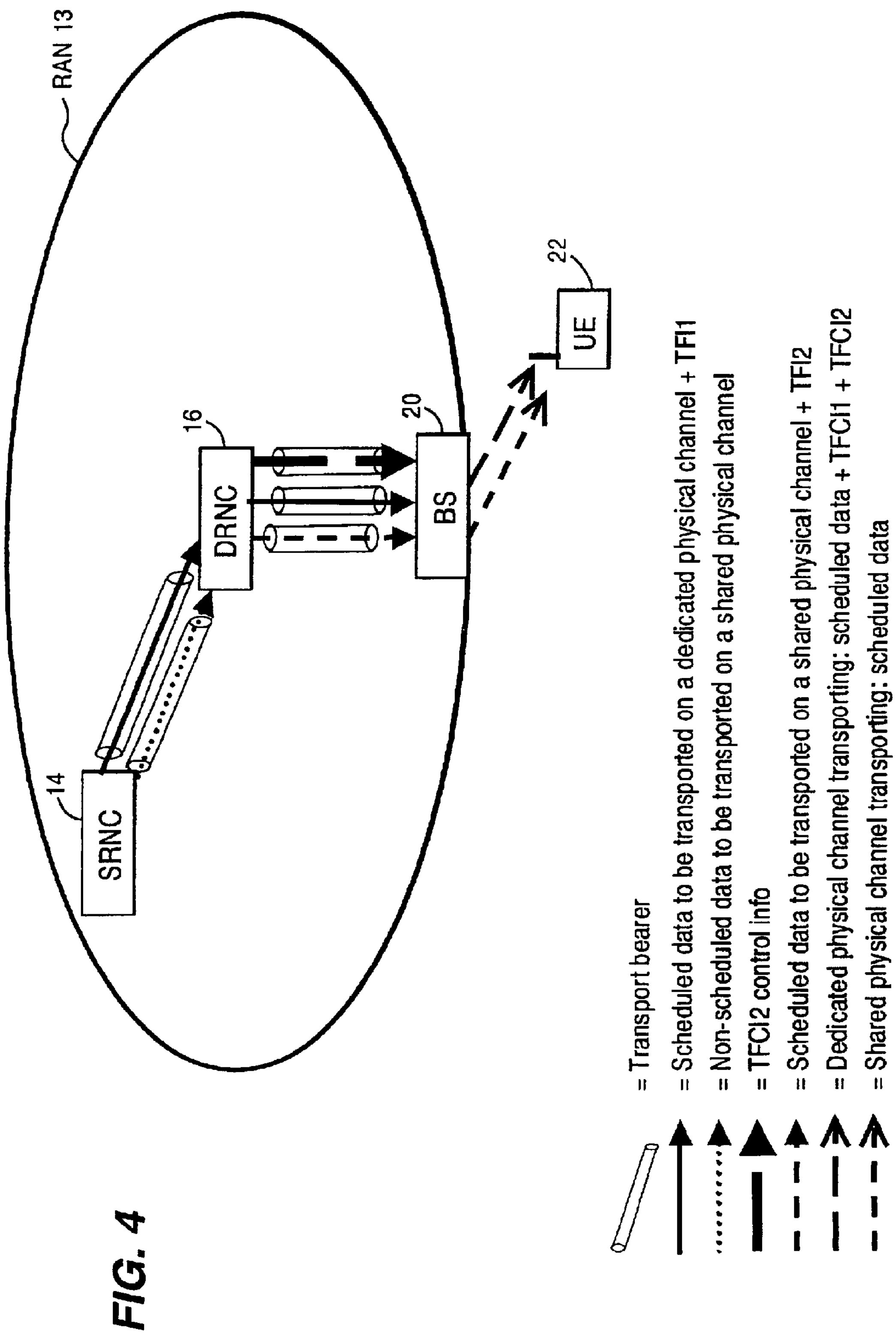
FIG. 4 shows an example embodiment of the present invention in which a transport format indicator originated in a DRNC is communicated from the DRNC to a base station over a separate transport bearer.

To overcome these drawbacks and limitations, (and perhaps others), the present invention employs a separate transport bearer between a controlling-RNC(CRNC) and a BS to transport CRNC-originated control information that is to be transmitted by the BS to the mobile terminal on a dedicated physical radio channel. FIG. 4 illustrates an example of such a separate transport bearer (the thick dashed line) between a DRNC (the controlling RNC for BS2) and BS2 that conveys such information, e.g., TFCI2 control information originated in the DRNC. Although not shown, in a configuration that includes only an SRNC and a base station, (i.e., there is no DRNC supporting the connection), it may be appropriate or otherwise desirable to establish a separate transport bearer to carry the control information such as TFI information generated by the SRNC.

Although the invention may transmit various types of control information over the separate transport bearer, the non-limiting, example described hereafter is TFCI2 control information. Rather than inserting the TFCI2 (or other control information) into the information stream related to the dedicated physical channels, a separate transport bearer is established from the DRNC to the BS (the thick dashed line) to convey the control information, e.g., the TFIC2.

There are three transport bearers established between the DRNC 16 and the base station 20. A first transport bearer carries to the DRNC scheduled data to be transported on a shared radio channel, like the DSCH. A second transport bearer transports the SRNC-scheduled data to be transported on a dedicated radio channel, such as the DCH, along with control information originated at the SRNC, such as the TFI1. The third transport bearer transports the control information originated at the DRNC 16, which in this case, is the TFCI2.

Figure 5:
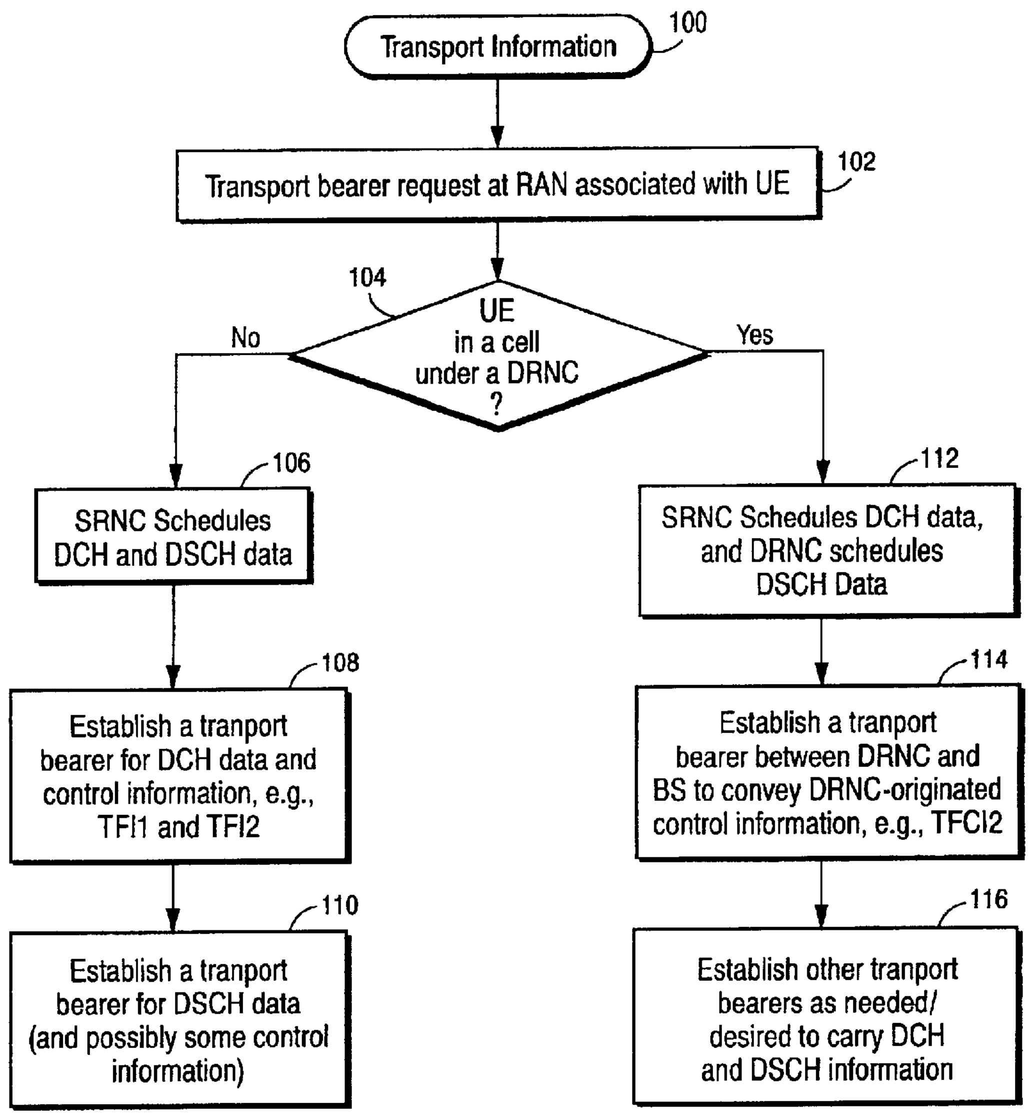
FIG. 5 is a flowchart diagram illustrating procedures in accordance with one example implementation of the present invention.

A Transport Information procedure (block 100) is now described in conjunction with the flowchart illustrated in FIG. 5. A transport bearer request is received at the RAN to establish a transport bearer between a particular UE mobile radio and a core network (block 102). A decision is made (block 104) whether the UE is in the cell under the control of the drift RNC. Of course, the connection is initially established byway of a serving RNC and a base station cell under the control of that serving RNC. However, through movement of the UE during the lifetime of the connection, it may be handed over to a cell under the control of a drift RNC.

If there has been no handover to a DRNC cell, the SRNC schedules user data for transmission over a dedicated radio channel and a shared radio channel, e.g., DCH and DSCH, respectively (block 106). The shared radio channel handles transmission of bursty traffic (like WWW data) sent to UEs more efficiently than a dedicated channel. The SRNC establishes a transport bearer to transport the DCH data as well as control information for the DCH and possibly also the DSCH, e.g., TFI1 and TFI2 (block 108). The SRNC also establishes a transport bearer to transport the DSCH data (and possibly some control information) (block 110).

If the UE is in a cell under the control of a drift RNC (DRNC), the SRNC schedules the DCH data and the DRNC schedules the DSCH data (block 112). The DRNC establishes a separate transport bearer between the DRNC and the base station to convey DRNC-originated control information (e.g., TFCI2) (block 114). Other transport bearers are established between the DRNC and base station to transport DCH and DSCH information (block 116).

Figure 6:
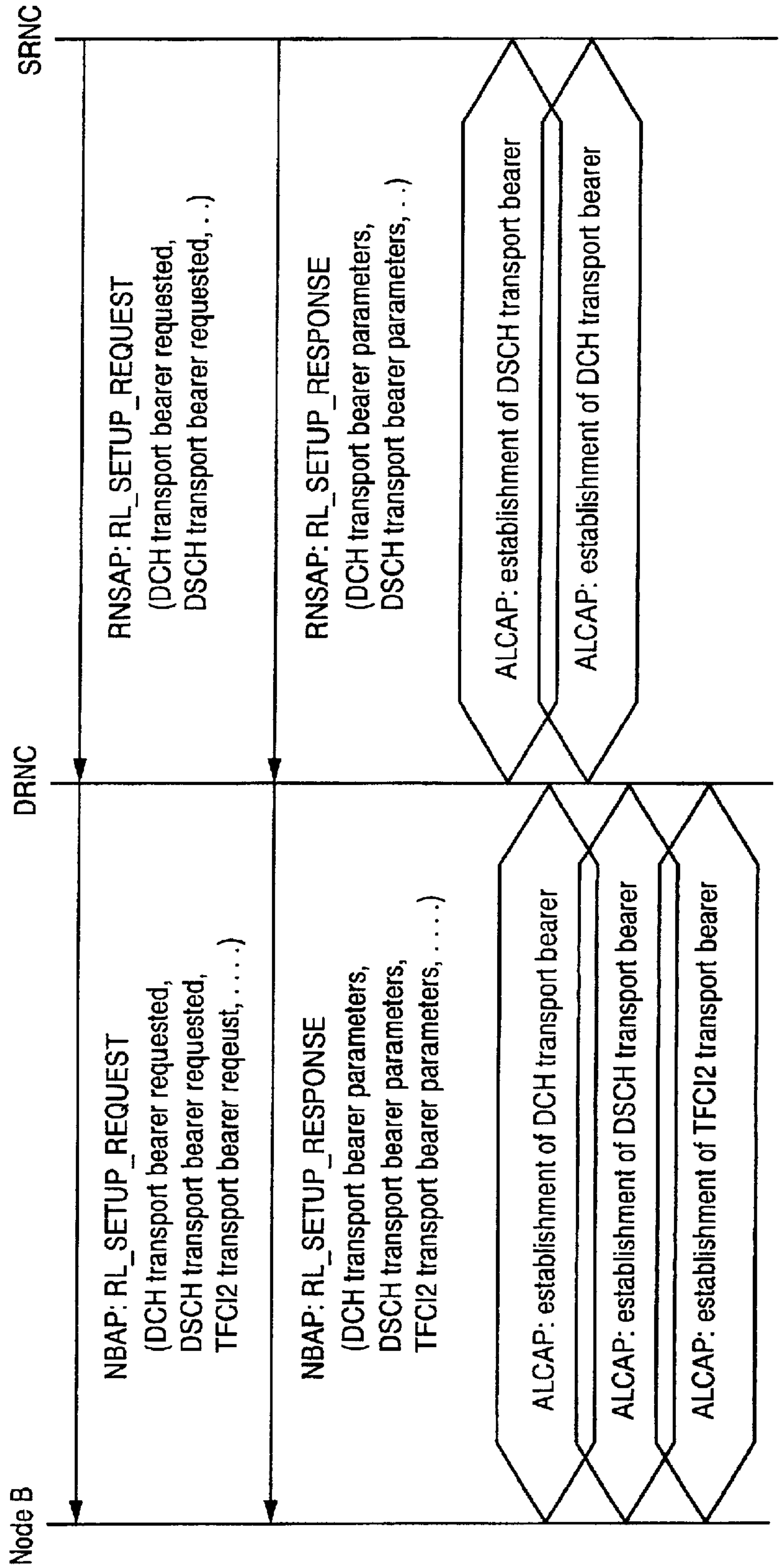
FIG. 6 is an example signaling procedure for setting up a separate transport bearer between a DRNC and a base station for communicating DRNC-originated control information.

This example implementation of the present invention can be further implemented using appropriate signaling between the SRNC, DRNC, and base station (sometimes referred to as "node B"). FIG. 6 illustrates an example signaling diagram. The SRNC communicates with the DRNC using a Radio Network Subsystem Application Protocol (RNSAP). The DRNC communicates with the base station (node B) using a Node B Application Protocol (NBAP). An ALCAP protocol is used to establish transport bearers in the RAN.

An RL_SETUP_REQUEST message is sent from the SRNC to the DRNC along with a specific request for a DCH transport bearer and a DSCH transport bearer. The DRNC sends a corresponding message RL_SETUP_REQUEST to the base station node B and includes a TFIC2 transport bearer request along with the DCH and DSCH transport bearer requests. The base station returns an RL_SETUP_RESPONSE message to the DRNC and includes DCH, DSCH, and TFCI2 transport bearer parameters, e.g., transport layer addresses, binding identifiers, etc. The DRNC sends an RL_SETUP_RESPONSE message to the SRNC including the DCH and DSCH transport bearer parameters. Accordingly, DCH and DSCH transport bearers are established between the SRNC and DRNC using ALCAP signaling. DCH, DSCH, and TFCI2 transport bearers are established between the DRNC and the base station node B also using ALCAP signaling.

Figure 7:
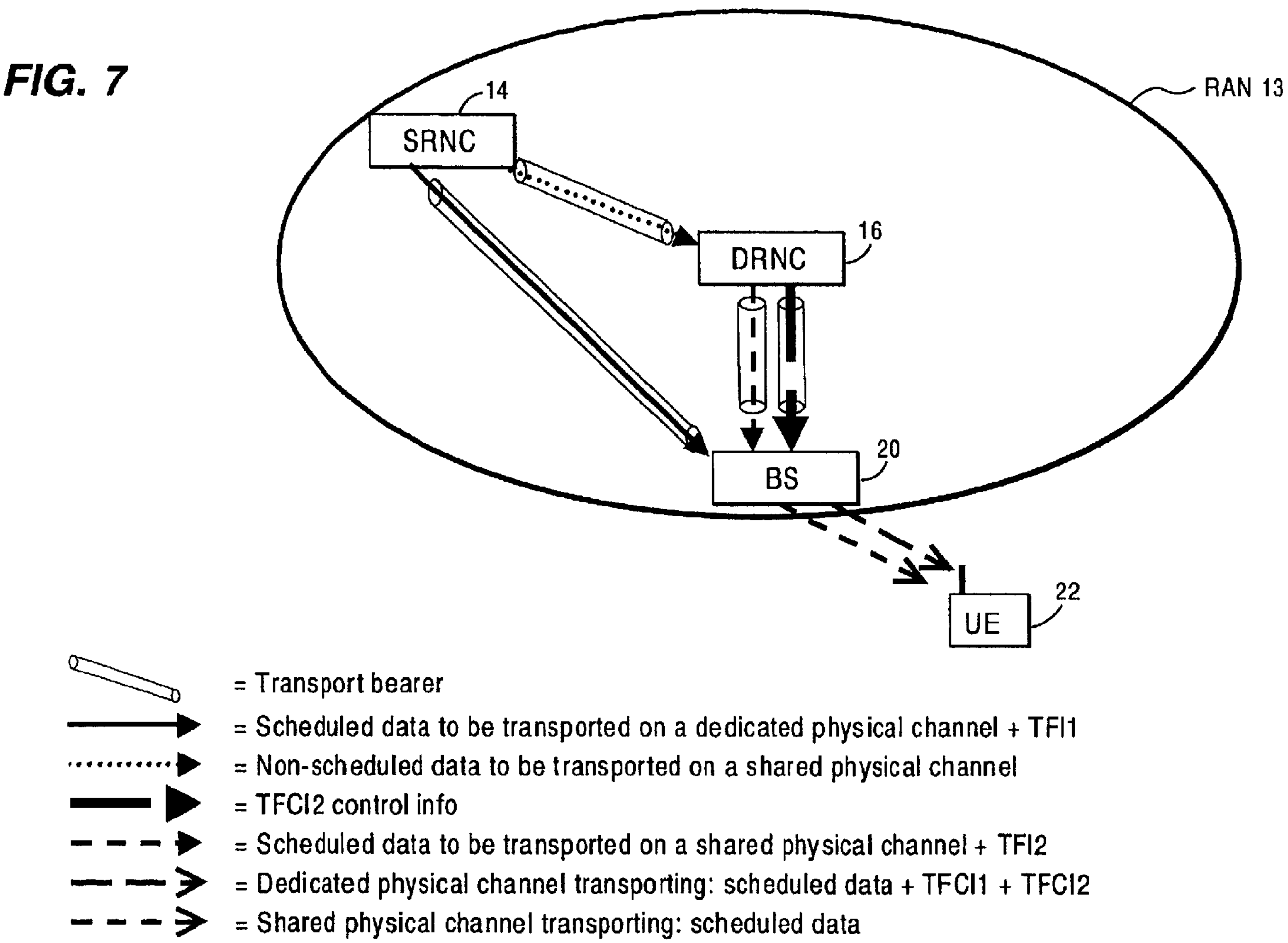
FIG. 7 shows an example of implementation of the invention in a differently configured RAN.

FIG. 7 illustrates another non-limiting, example RAN implementation where data to be transmitted on a dedicated physical radio channel is transported in the RAN directly from the SRNC to the BS, along with any associated control information, e.g., the TFCI1. In FIG. 7, however, the direct transport bearer between the SRNC and the BS to transport dedicated physical channel information eliminates the need to relay this information through the DRNC. By not routing the transport bearer through an intermediate DRNC node, internal RAN transport delay is decreased. Thus, BS2 receives the TFI1 information directly from the SRNC. However, because a separate transport bearer is established between the DRNC and BS2 to carry DRNC-originated control information relating to the DSCH data, the TFCI2 control information may also be communicated to BS.

A separate control information transport bearer does not need to be used in all situations. If the CRNC corresponds to the SRNC, the CRNC-originated control information to be transmitted on a dedicated physical channel over the radio interface may be multiplexed on the direct Iub transport bearer from the SRNC to the BS along with the dedicated physical channel information. A separate transport bearer could also be used. If the CRNC is a DRNC tasked with transmitting non-scheduled data via a shared physical channel, and with generating control information to be transmitted on the dedicated physical channels over the radio interface, the DNRC establishes a separate transport bearer to transport DRNC-originated control information. Consequently, control information originated by the DRNC is simply sent by way of the separate transport bearer. Data received from the SRNC is quickly and transparently passed through the DRNC to the base station. In addition, the DRNC, and not the SRNC, is able to perform any timing adjustment functions required by the base station for data which is scheduled by the DRNC. Also, the invention allows flexibility with potential changes to the RAN configuration, an example of which was just described above in conjunction with FIG. 7. Namely, the dedicated channel data can go directly from the SRNC to the base station even though the shared channel scheduling is done in the CRNC. This configuration reduces delays in handling of dedicated channel data.

While the present invention has been described with respect to a particular embodiment, those skilled in the art will recognize that the present invention is not limited to the specific example embodiments described and illustrated herein. Again, the invention is not limited to the TFI and/or TFCI examples provided above. Different formats, embodiments, and adaptations besides those shown-and described as well as many modifications, variations, and equivalent arrangements may also be used to implement the invention.

What is claimed is:

1. In a radio access network (RAN) where information may be sent to a mobile radio unit using a dedicated radio channel dedicated to a mobile radio unit during a communication or using a shared radio channel shared by other mobile radio units during the communication, a method comprising:

establishing between a first RAN node corresponding to a controlling radio network controller (CRNC) and a second RAN node corresponding to a base station (BS) a first RAN transport bearer to transport from the CRNC to the BS data to be transmitted on the shared radio channel by the BS, and establishing between the CRNC and the BS a second RAN transport bearer to transport control information originated in the CRNC relating to the first transport bearer data to the BS.

2. The method in claim 1, further comprising:

the CRNC transmitting the control information over the second transport bearer to the BS.

3. The method in claim 1, wherein the control information includes scheduling information.

4. The method in claim 1, wherein the control information indicates information needed by the mobile radio unit to decode the data transmitted over the shared radio channel.

5. The method in claim 4, wherein the needed information includes one or more of the following: a frame identifier, a radio channel identifier, and an indication of how different radio channels are multiplexed on the identified frame.

6. The method in claim 1, wherein the control information includes transport format information.

7. The method in claim 1, wherein the control information includes a transport format indicator.

8. The method in claim 7, wherein the transport format indicator includes a frame identifier and an index to a lookup table stored in the mobile radio unit containing information relating to how a transport channel is multiplexed on the shared radio channel, wherein the shared radio channel is specified by a channelization code and a spreading factor.

9. The method in claim 1, wherein information may be sent to the mobile radio unit using a dedicated radio channel, the method further comprising:

establishing a third transport bearer to carry dedicated radio channel data and dedicated radio channel control information through the RAN for transmission to the mobile radio unit on the dedicated radio channel.

10. The method in claim 9, wherein the dedicated radio channel carries the dedicated control information and the control information originated at the CRNC to the mobile radio unit.

11. The method in claim 10, wherein the third transport bearer is established between the SRNC and the DRNC and between the DRNC and the BS.

12. The method in claim 10, wherein the third transport bearer is established between the SRNC and the BS.

13. The method in claim 9, wherein the CRNC is a drift radio network controller (DRNC), and wherein the RAN includes a third RAN node corresponding to a serving radio network controller (SRNC) coupled to the DRNC, the method further comprising:

the SRNC providing data to be transmitted to one or more mobile radio units to the DRNC over the third transport bearer.

14. In a radio communications system including a radio access network (RAN) with a serving radio network controller (SRNC) coupled to one or more radio base stations and a drift radio network controller (DRNC) coupled to one or more radio base stations, where the base stations communicate with mobile radio units over a radio interface using radio channels, a method comprising:

establishing a first RAN transport bearer to transport information supervised by the SRNC for transmission by a base station over a dedicated radio channel to a mobile radio unit;

establishing a second RAN transport bearer to transport information supervised by the DRNC for transmission by the base station over a shared radio channel to the mobile radio unit; and establishing a third RAN transport bearer to transport DRNC-originated information from the DRNC to the base station.

15. The method in claim 14, wherein the DRNC-originated information relates to the information supervised by the DRNC.

16. The method in claim 15, wherein the DRNC-originated information is a traffic format indication message originated by the DRNC.

17. The method in claim 16, wherein the traffic format indication message originated by the DRNC instructs the mobile radio unit how to receive information on the shared radio channel.

18. The method in claim 14, further comprising:

the DRNC transporting DRNC-originated information over the third transport bearer for instructing the mobile radio unit how to receive information on the shared radio channel.

19. For use in a radio access network (RAN) where information may be sent to one or more mobile radio units using a dedicated radio channel dedicated to a mobile radio unit during a communication or using a shared radio channel during the communication, a RAN node for communicating with a base station, comprising:

a controller configured to establish a first logical RAN transport bearer between the RAN node and related to the user data transported over the first logical RAN transport bearer and the base station to transport user data to be transmitted on the shared radio channel, and to establish a second transport bearer between the RAN node and the base station to transport control information originated in the RAN node, wherein the control information indicates to a mobile radio unit receiving transmissions from the base station information needed to decode information transmitted over the shared radio channel.

20. The RAN node in claim 19, wherein the needed information includes one or more of the following: a frame identifier, a radio channel identifier, and an indication of how different radio channels are multiplexed on the identified frame.

21. The RAN node in claim 19, wherein the control information includes transport format information.

22. The RAN node in claim 21, wherein the control information includes a transport format indicator.

23. The RAN node in claim 22, wherein the transport format indicator includes a frame identifier and information that is useable by a mobile radio to address a lookup table stored in the mobile radio containing information relating to how a radio channel is multiplexed in the identified frame, wherein the radio channel is specified by a channelization code and a spreading factor.

24. The RAN node in claim 19, wherein the RAN node is a drift radio network controller (DRNC) configured to communicate with a serving RNC (SRNC).

25. The RAN node in claim 24, wherein the controller is configured to establish a third transport bearer to the base station to transmit data be transmitted on a dedicated radio channel.

26. A radio access network (RAN), comprising:

a serving radio network controller (SRNC) for initially establishing a connection with a mobile radio unit over a radio interface;

a drift radio network controller (DRNC) for providing resources to the SRNC to support the connection; and a base station associated with the DRNC for conveying user data connection information to the mobile unit over a shared radio channel shared by other mobile radio units during communication with the mobile radio unit, wherein the DRNC is configured to establish a first RAN transport bearer between the DRNC and the base station to transport the user data connection information from the DRNC to the base station to be sent on the shared radio channel and a second RAN transport bearer between the DRNC and the base station to transport control information related to the connection information from DRNC to the base station.

27. The radio access network in claim 26, wherein the SRNC is configured to establish a third transport bearer to carry connection information to be transmitted on a dedicated radio channel between the base station and the mobile radio unit.

28. The radio access network in claim 27, wherein the SRNC is configured to establish the third transport bearer with the base station.

29. The radio access network in claim 27, wherein the SRNC is configured to establish the third transport bearer with the base station by way of the DRNC.

30. The radio access network in claim 26, wherein the control information includes one or more of the following: a frame identifier, a radio channel identifier, and an indication of how different radio channels are multiplexed in the identified frame.

31. The radio access network in claim 26, wherein the control information includes transport format information.

32. The radio access network in claim 26, wherein the control information includes a transport format indicator.

33. A radio access network (RAN) where information may be sent to a mobile radio unit using a shared radio channel shared by other mobile radio units during a communication with the mobile radio unit, comprising:

first means for establishing between a controlling radio network controller (CRNC) and a base station (BS) a first logical RAN transport bearer to transport data to be transmitted on the shared radio channel, and second means for establishing between the CRNC and the BS a second logical RAN transport bearer for transporting control information originated in the CRNC relating to the first transport bearer data.

34. The RAN in claim 33, wherein the CRNC is a drift radio network controller (DRNC).

35. The RAN in claim 33, wherein a shared radio channel is a different type of radio channel than a dedicated radio channel.

36. The RAN in claim 33, wherein a shared radio channel is a different type of radio channel than a dedicated radio channels.

* * * * *